Sept. 3, 1940.　　　W. F. HEESCH　　　2,213,702
WHEEL
Filed Sept. 1, 1938
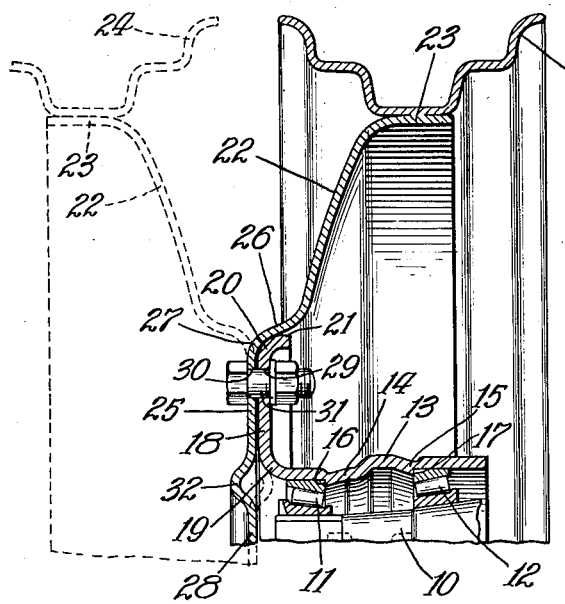
Fig. 1.
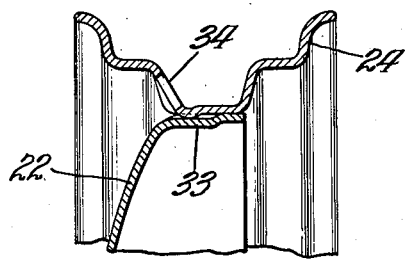
Fig. 2.
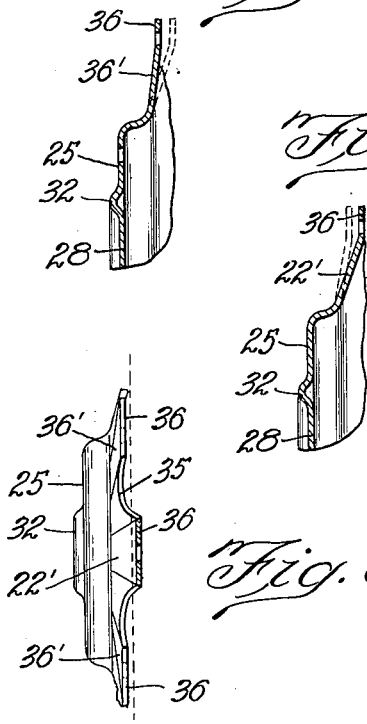
Fig. 4.
Fig. 5.
Fig. 6.
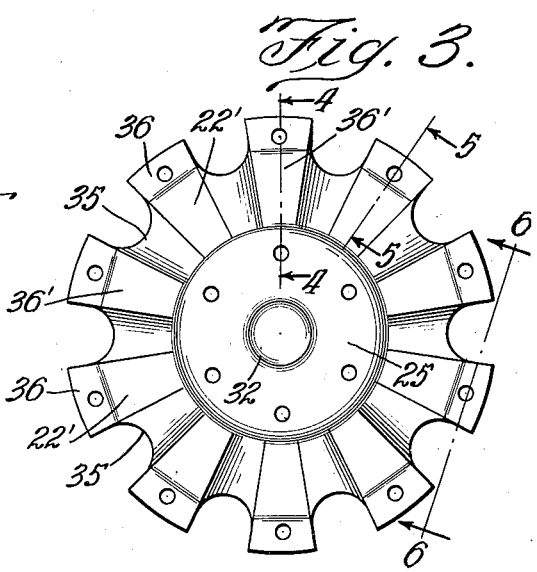
Fig. 3.
Inventor:
William F. Heesch
By: Edward C. Gritzbaugh
Atty.

Patented Sept. 3, 1940

2,213,702

UNITED STATES PATENT OFFICE 2,213,702

WHEEL

William F. Heesch, Chicago, Ill., assignor to Borg-Warner Corporation, a corporation of Illinois Application September 1, 1938, Serial No. 227,937

5 Claims. (Cl. 301—9)

This invention relates to wheels, and particularly to steel wheels of either the spoke or disc types.

It is customary in the manufacture of steel wheels to make such wheels with a tapering cross-section so as to distribute the bending stresses uniformly along the radius of the wheel. It has also been customary to make an opening in the central portion of the wheel to provide access to the hub, axle, or wheel mounting means. The opening in the central portion of such wheels is generally covered by a hub cap which may or may not be ornamental.

In order to secure a wheel with a uniformly tapering cross-section, it is necessary to start out with a blank having constant cross-section, and then by suitable forging operations reduce the thickness of the blank from a central point outward, the central point corresponding to the center of the finished wheel. This, of course, leaves a rough surface and a ragged edge, both of which must be removed by subsequent operations.

Assuming that the blanks from which the wheel is made is a rectangular or square blank, it will be readily appreciated that a substantial amount of metal must be removed from the edges of the blank in order to change its form from that of a rectangle to a circle. In addition to this material which is removed from the edges of the blank, there is also removed a circular portion at the center of the wheel for the purpose mentioned above. This central portion, since it is at the point of greatest thickness, likewise represents a very substantial loss of material.

In order to conceal the central opening and the hub to which it provides access, it is necessary to form a disc-shaped cap and to provide some means for securely holding said cap over the opening. The cap is usually stamped out of sheet metal which again entails a loss of material, and a further loss of material is occasioned in the manufacture of the means for holding the cap in place.

The object of this invention is to provide a steel wheel which is strong and yet which is exceedingly economical to make.

Another object of this invention is to provide a wheel body and hub construction for a wheel, which is such as to reinforce the wheel body at the weakest points thereof, the reinforcing means serving the additional function of sealing the outer end of the hub against the ingress of dirt to the bearings within the hub, and relieving the attaching means of shearing stresses.

Still another object of this invention is to provide a wheel body and hub construction for a steel wheel wherein the wheel body may be reversed with respect to the hub and yet may provide a seal between the wheel body and hub in both positions, said seal likewise serving in both positions to relieve the attaching means of shearing stresses.

A still further object of this invention is to provide a steel wheel having a combined wheel body and hub cap, the wheel body being provided with a plurality of axially spaced rows of attaching means for attaching the wheel body to a rim.

These and other objects and features of this invention will become apparent from the following description when taken together with the accompanying drawing, in which:

Fig. 1 is a section through one-half of a wheel and hub incorporating this invention;

Fig. 2 is a section through a fragment of the wheel body and rim of a wheel to be used with pneumatic tires;

Fig. 3 is an elevation of a wheel body showing the solid central portion which serves as a hub cap and a scalloped edge showing a plurality of attaching means at the periphery of the wheel body; and Figs. 4, 5 and 6 are sections taken through the wheel body of Fig. 3 as indicated thereon.

In its preferred form, this invention comprises a wheel body having a constant cross-section and a centrally located axial off-set to give the wheel body stiffness. The hub is preferably made from steel tubing, and is formed with a flange which is adapted to fit into the off-set in the wheel body. The outer periphery of the flange is curved and then tapered so that the walls of the off-set and the outer periphery of the flange have a non-parallel relation. Thus, by drawing the flange into the axially off-set portion, a snug fit will be secured between the flange and the off-set whereby to seal the interior of the hub against the entrance of dirt thereinto. The means for drawing the flange into the off-set may be ordinary bolts and nuts, and preferably the drawing means will be the bolts which are used to mount the wheel body on the hub.

The inner periphery of the flange on the hub is curved, and opposite said inner periphery is another axial off-set on the wheel body, the second off-set being of small diameter to fit into the inner periphery of the hub. The second off-set is effective as a seal when the wheel body is reversed with respect to the hub.

Referring now to the drawing for a detailed description of the invention, 10 is a fragment of an axle having roller bearings 11 and 12 mounted thereon. Axle 10 may be straight or it may be tapered, and roller bearings 11 and 12 will therefore be of a suitable type to mount on the axle selected.

Mounted on roller bearings 11 and 12 is a hub 13 which is preferably made from steel tubing. Said hub 13 has annular grooves 14 and 15 pressed therein to form shoulders 16 and 17 for the retention of roller bearings 11 and 12 respectively. The left-hand end (Fig. 1) of hub 13 is flared outwardly to form a radial flange 18. The inner periphery 19 of flange 18 is curved as shown, and the outer periphery 20 of flange 18 is likewise curved or curled, the surface 21 of the outer peripheral region 20 being in the form of a long tapered cone. The taper may be in the neighborhood of five degrees with the axis of the wheel.

To the left of flange 18 (Fig. 1) is a wheel body 22 which is cambered so as to provide an off-set portion 23 upon which a rim 24 may be mounted. It is customary to make the off-set such that the line of pressure from the rim will pass through or in proximity to one of the roller bearings, and preferably the roller bearing furthest from the free end of the axle.

It is apparent thus far that if a wheel body of constant cross-section is used, it will tend to crack at a point near the means used to support the wheel body on the hub. The cracking is due mainly to the crystallization of the steel by reason of its constant flexing over a very narrow area. This situation may be alleviated to some extent by forming some irregularity in the surface of the wheel body so as to stiffen it. Accordingly, wheel body 22 is provided with an axial off-set 25 having tapered walls 26 which join off-set portion 25 through a rounded corner 27. By reason of the fact that walls 26 are almost normal to the direction of thrust, rounded corner 27 is very highly stressed. In the usual installation the cracks if they occur at all, occur at corner 27. The manner in which I have strengthened wheel body 22 at corner 27 will be described later.

Contrary to the usual practice, I do not remove any material from the central region 28 of wheel body 22, but prefer to leave this portion solid. By this means I am able to enclose hub 13, axle 10, and the cooperating bearings 11 and 12 without the use of a hub cap.

Flange 18 is provided with a series of bolt holes 29, which are in alignment with a similar series of bolt holes 30 in the off-set portion 25 of wheel body 22. Wheel body 22 may therefore be mounted upon flange 18 by means of bolts 31, which pass through both series of bolt holes. It will be noted, however, that wall 26 of off-set portion 25 and the outer periphery of flange 18 are in contact before flange 18 and off-set portion 25 come in contact with one another. By tightening bolts 31, therefore, the outer periphery of flange 18 and the walls of off-set portion 25 will be drawn together tightly to form a seal between the flange and wheel body. This seal makes the use of a hub cap unnecessary.

It will be recalled that corner 27 in the usual wheel construction is very highly stressed and is apt to develop cracks before any other portion of the wheel body. Since the outer periphery of flange 18 contacts walls 26 of off-set portion 25, the highly stressed corner 27 is greatly strengthened. Vertical and side stresses can, therefore, be taken by the flange as well as by the central portion of the wheel body.

It is often desirable, especially on farm machinery, to change the spacing between wheels. A very simple way to do this is to reverse the wheel body. It will be noted, however, that if wheel body 22 is reversed with respect to flange 18, the beneficial sealing and supporting effect between the outer peripheral region of the flange and the side 26 of off-set portion 25 is lost. A similar effect, however, may be obtained by forming a second axial off-set 32 opposite the inner peripheral region 19 of flange 18, such that the sides of said axial off-set 32 will cooperate with inner peripheral region 19 in the same manner as the outer peripheral region of the flange cooperates with off-set portion 25 to exclude dirt and support the wheel body. For greater rigidity, the second off-set may be in the form of a bead of circular shape which will cooperate with inner peripheral region 19 as shown in dotted lines in Fig. 1.

Rim 24 is shown in Fig. 1 as being attached to wheel body 22 by means of a weld. If the rim is to support a pneumatic tire and is to be of the drop-center type as shown in Fig. 2, provision must be made for obtaining access to the valve. The outer portion 23 of wheel body 22 may, therefore, be depressed as at 33 to permit side wall 34 of drop-center rim 24 to be enlarged to accommodate a valve stem.

Instead of a permanent connection between rim 24 and wheel body 22 as shown in Figs. 1 and 2, the detachable form of connection shown in Figs. 3 to 6 inclusive may be used. This latter form is particularly useful where other spacings besides those provided by a mere reversal of the wheel body are desirable. As shown in Fig. 3, wheel body 22' may be provided with a scalloped periphery 35 to form a series of flat surfaces 36. Each of said surfaces 36 may then be off-set from the general plane of wheel body 22 to provide two or more rows of lugs, each row being axially spaced from the other. Thus, lugs 36 will be in one plane and alternate lugs 36' will be in another plane. It is understood that the rim which is to be mounted on wheel body 22' is provided with radially inwardly extending lugs which are adapted to be bolted to lugs 36 or 36' of wheel body 22'.

In view of the radial corrugations formed in the surface of wheel body 22' by the construction shown in Fig. 3, that portion of the wheel body which is outside of the off-set portion of the wheel body cooperating with flange 18 will be further strengthened, and the wheel as a whole will be more satisfactory.

It is understood that the foregoing is merely illustrative of the preferred embodiments of my invention, and that the scope of the invention, therefore, is not to be limited thereto, but is to be determined by the appended claims.

I claim:

1. In a wheel, a hub, a wheel body which is continuous over the central portion thereof to cover the hub, means for reversibly mounting the wheel body on the hub, and two pairs of differently curved surfaces on the wheel body and hub, one pair cooperating when the wheel body is mounted in an obverse manner with respect to said hub to form a seal therebetween and the other pair cooperating to form a seal between the wheel body and hub when the wheel body is mounted in a reverse manner with respect to said hub.

2. In a wheel, a hub, a wheel body which is continuous over the central portion thereof to cover the hub, said wheel body being reversibly mountable on said hub, a radial flange on the hub, the outer and inner peripheral regions of said flange being curved, an axial off-set in one surface of the wheel body having curved walls adapted to cooperate with the outer peripheral curved region of the flange to form a seal therebetween, and a bead on the opposite surface of the wheel body which is adapted to cooperate with the inner peripheral region of the flange to form a seal therebetween when the wheel body is reversed with respect to said hub.

3. A wheel assembly comprising a hub, a wheel body detachably secured to said hub and having a solid central portion for covering the hub, means on said wheel body and hub for positioning and supporting the wheel body on the hub, said wheel body being reversibly mountable with respect to said hub to provide a plurality of axial wheel spacings, and other means on the wheel body and hub effective when the wheel body is reversed to position and support the wheel body on the hub and additionally to form a seal between the wheel body and hub to prevent the ingress of foreign matter to said hub.

4. A wheel assembly comprising a hub, a wheel body detachably secured to said hub and having a solid central portion for covering the hub, means on said wheel body and hub for positioning and supporting the wheel body on the hub, said means also serving to form a seal between the wheel body and hub to prevent the ingress of foreign matter to the hub, said wheel body being reversibly mountable with respect to said hub to provide a plurality of axial wheel spacings, and other means on the wheel body and hub effective when the wheel body is reversed to position the wheel body on the hub, and effective additionally to form a seal between the wheel body and hub.

5. In a wheel a flanged hub, a wheel body which is solid over the central region thereof to cover the hub, means for reversibly mounting said wheel body with respect to said hub, means on said flange and said central region of the wheel body for forming a seal between the wheel body and hub in the obverse mounting of the wheel body with respect to the hub, and other means on said flange and said central region of the wheel body for forming a seal between the wheel body and hub in the reverse mounting of the wheel body with respect to the hub.

WILLIAM F. HEESCH.